(12) United States Patent
Zhang

(10) Patent No.: US 7,340,099 B2
(45) Date of Patent: Mar. 4, 2008

(54) SYSTEM AND METHOD FOR IMAGE FUSION

(75) Inventor: Yun Zhang, Fredericton (CA)

(73) Assignee: University of New Brunswick, Fredericton, New Brunswick (CA)

( * ) Notice: Subject to any disclaimer, the term of this patent is extended or adjusted under 35 U.S.C. 154(b) by 623 days.

(21) Appl. No.: 10/345,932

(22) Filed: Jan. 17, 2003

(65) Prior Publication Data

US 2004/0141659 A1    Jul. 22, 2004

(51) Int. Cl.
*G06K 9/46* (2006.01)
(52) U.S. Cl. .......................... 382/191; 348/33
(58) Field of Classification Search ............... 382/284, 382/294, 169, 168, 191; 348/33
See application file for complete search history.

(56) References Cited

U.S. PATENT DOCUMENTS

| 4,805,016 A * | 2/1989 | Kato ........................... 348/71 |
| 5,949,914 A | 9/1999 | Yuen |
| 6,011,875 A * | 1/2000 | Laben et al. ................. 382/276 |
| 6,097,835 A | 8/2000 | Lindgren |
| 6,269,175 B1 | 7/2001 | Hanna et al. |
| 6,580,825 B2 * | 6/2003 | Bhaskar ....................... 382/169 |
| 6,584,216 B1 * | 6/2003 | Nyul et al. .................. 382/131 |

OTHER PUBLICATIONS

Cornet et al., RS Data Fusion by Local Mean and Variance Matching Algorithms: their Respective Efficiency in a Complex Urban Content, Nov. 8-9, 2001, IEEE/ISP 2001 Remote Sensing and Data Fusion over Urban Areas, pp. 105-109.*

Zito-Jiao et al., Classification-Based Fusion of IKONOS 1-m High-Resolution Panchromatic Image and 4-m Multi-Spectral Images, Jul. 9-13, 2001, IGARRS '01, vol. 2, pp. 703-705.*

Pohl, C. et al., Multisensor Image fusion in remote sensing: concepts, methods and applications, International Journal of Remote Sensing, 1998, vol. 19, No. 5, pp. 823-854.

Zhang, Y et al., Photogrammetric Engineering & Remote Sensing, vol. 59, No. 1, Jan. 1, 1993, pp. 67-72.

Zhang, Y et al., Vergleich verschiedener Verfahren zur Kombination multispectraler Satelliten-Bilddaten, Photogrammetrie-Fernerkundung-Geoinformation, May 1998, pp. 261-274.

Zhang, Y., A New Merging Method and its Spectral and Spatial Effect, International Journal of Remote Sensing, 1999, vol. 20, No. 10, pp. 2003-2014.

Munechika et al., Resolution Enhancement Multispectral Image Data to Improve Classification Accuracy, Photogrammetric Engineering & Remote Sensing, vol. 59, No. 1, 1993.

Zhang, Y. et al., Vergleich verschiedener Verfahren zue Kombination multispectraler Satelliten-Bilddaten, Photogrammetrie-Femerkundung-Geoinformation, May 1998, pp. 261-274.

Zhang, Y., A New Merging Method and its Spectral and Spatial Effects, International Journal of Remote Sensing, 1999, vol. 20, No. 10, pp. 2003-2014.

* cited by examiner

*Primary Examiner*—Matthew C. Bella
*Assistant Examiner*—Dennis Rosario
(74) *Attorney, Agent, or Firm*—Eugene F. Darenyl

(57) ABSTRACT

A method of fusing a low resolution multispectral image with a high resolution panchromatic image comprising the step of generating a new synthetic pan image using multispectral bands from the multispectral image.

20 Claims, 4 Drawing Sheets

SYSTEM AND METHOD FOR IMAGE FUSION

FIELD OF THE INVENTION

This invention relates to the field of image processing, and in particular to a method for fusing low resolution multi-spectral images with high resolution panchromatic images or pan-sharpening.

BACKGROUND OF THE INVENTION

Generally, a multispectral band of a remote sensor covers a narrower spectral range than a panchromatic band. The size of the sensor's detectors for the multispectral bands is larger than that for the panchromatic band to receive the same amount of incoming energy. Therefore, most earth observation satellites, such as the SPOT, IRS, Landsat 7, IKONOS and QuickBird, provide simultaneously low-resolution multispectral and high-resolution panchromatic images.

Many remote sensing applications require images with both high spectral resolution and high spatial resolution. The multispectral images provide high spectral resolution, but low spatial resolution. On the other hand, the panchromatic images provide high spatial resolution, but low spectral resolution. Thus, methods for effectively fusing (combining) the multispectral and panchromatic images to produce fused high spatial resolution (also called pan-sharpened) colour images are important. As a result, many image fusion methods have been developed, such as IHS (Intensity, Hue, Saturation), PCA (Principal Components Analysis), wavelet based fusion and SVR (Synthetic Variable Ratio). Among existing methods, the IHS and PCA fusion approaches have been the most popular ones.

Pohl and Van Genderen (1998) provide a comprehensive review of most conventional fusion techniques (Multisensor image fusion in remote sensing: concepts, methods and applications. *International Journal of Remote Sensing*, 1998, Vol. 19, No. 5, pp. 823-854).

However, the available fusion techniques contain two major problems: (1) the colour distortion of the fused image is significant, especially for the new satellite images of Landsat 7, IKONOS and QuickBird; and (2) the fusion quality is operator dependent. An optimal fusion quality is defined as having (1) minimized colour distortion (almost identical to the colour of original image), (2) maximized spatial detail (containing all the detail of the panchromatic image), and (3) natural (smooth) integration of colour and spatial feature from multispectral and panchromatic images. Unfortunately, available fusion techniques cannot produce such optimal fusion quality without intensive manual intervention. Moreover, even with intensive manual intervention, the available fusion techniques can still not fuse well the multispectral and panchromatic images from the new satellites Landsat 7, IKONOS, and QuickBird.

RE (Ratio Enhancement) Method

The RE method is a fusion technique which has some similarity to the present invention. The RE technique is described in Munechika et al. 1993 (Resolution Enhancement of Multispectral Image Data to Improve Classification Accuracy. *Photogrammetric Engineering and Remote Sensing*, Vol. 59, No. 1, pp. 67-72), and in section "4.3.1.2. Difference and ratio images" of Pohl and Van Genderen (1998) (see above). The equations used in the RE fusion are similar to equations (1) and (2) below.

However, in Munechika et. al (1993) Landsat TM and SPOT pan images were fused, and the weighting factors $\phi_i$ were calculated according to the simulated digital signals of Landsat TM bands 1, 2, 3 and 4. These signals were simulated using a modified version of LOWTRAN equations and representative pixels manually selected from five land cover classes in the image area. Multiple regression was involved in the calculation of the weightings $\phi_i$.

Disadvantages and problems of the RE technique are that the method for obtaining $\phi_i$ is (i) operator dependent (manual selection of representative pixels of different classes), (ii) complicated (atmospheric models, LOWTRAN, are required to determine the digital signals of the selected pixels), and (iii) time consuming (interactive processes involving manual work and digital calculations are required), such that it is not suitable for industrial applications. Because digital signals of representative pixels from the five land cover classes were calculated to simulate the multispectral bands (the TM bands), the $\phi_i$ obtained was not a good representation of the colour characteristics of whole multispectral image. Further, the total spectral wavelength coverage of the TM bands 1, 2, 3 and 4 (0.45 to 0.90 μm) exceeds significantly the spectral coverage of the SPOT pan image (0.51 to 0.73 μm). Consequently, the simulated $Pan_{Syn}$ image (see equation (2) below) did not represent well the grey value characteristics of the original multispectral and panchromatic images.

The fusion result was thus not optimal. This is a fatal problem of this technique. Even the authors themselves recognized this problem and tried to further modify the method for better results. However, further modifications, illustrated in the same paper, did not show any improvement in quality.

The Zhang SVR (Synthetic Variable Ratio) Method

The Zhang SVR method has some common components to the present invention. It was described in Zhang, Y., 1998: Vergleich verschiedener Verfahren zur Kombination multispectraler Satelliten-Bilddaten, *Photogrammetrie-Fernerkundung-Geoinformation, May* 1998, pp. 261-274; and Zhang, Y., 1999: A new merging method and its spectral and spatial effects. *International Journal of Remote Sensing*, Vol. 20, No. 10, pp. 2003-2014 which are incorporated herein by reference. The fusion principle can be described using equations (1), (2) and (3) below:

$$\text{Fused Band}_i = \text{Multi}_i \times \frac{Pan_{Orig}}{Pan_{Syn}} \quad (1)$$

with i=1, 2, 3 for three multispectral bands, and $$Pan_{Syn} = \sum \varphi_i Multi_i \quad (2)$$

where $Multi_i$ are the three multispectral bands to be pan-sharpened, and $Pan_{Orig}$ is the original panchromatic band. The weights $\phi_i$ for calculating the synthetic panchromatic band $Pan_{Syn}$ are solved using multiple regression directly from the three multispectral bands being fused:

$$Pan_{Orig} = \sum \varphi_i Multi_i \quad (3)$$

The fusion process of the Zhang SVR method is described in FIG. 1. For example, if the multispectral bands TM 1, 2, 3 are being pan-sharpened, the same bands are used in equation (3) for calculating the $\phi_i$ (step 1 in FIG. 1), and then the same bands are used in equation (2) for calculating the $Pan_{Syn}$ (step 2 in FIG. 1). The pan-sharpened TM 1, 2, and 3 bands are generated using equation (1) by multiplying individual multispectral bands with the ratio of original pan to synthetic pan (step 3 in FIG. 1). If TM 4, 5, 7 are being fused, TM 4, 5, 7 will be used for calculating the $\phi_i$ and then the $Pan_{Syn}$.

These changes were the major improvements over the RE method suggested by Munechika et al. (1993). These improvements eliminated the manual selection of representative pixels from classes of interest so that the process of calculating $\phi_i$ became operator independent. Only the multispectral bands being pan-sharpened are used in the fusion process so that the fusion process is simplified. The $\phi_i$ represent the colour characteristics of the whole image, instead of only the classes of interest, so that colour distortion is reduced. As a result, the quality of the fused images is better in terms of colour fidelity and spatial detail.

However, the total spectral coverage of the multispectral bands used for simulating the synthetic pan image varies significantly from that of the original panchromatic image from case to case. Thus, the fusion quality of the SVR method is heavily dependant upon the operator's fusion experience when SPOT pan or IRS pan is fused with low resolution multispectral images. Moreover, satisfactory fusion results cannot be achieved when images from the "new" satellites such as IKONOS, QuickBird, and Landsat 7 are fused. All the IKONOS, QuickBird or Landsat 7 fusions contain significant colour distortion.

Limitation of Other Conventional Fusion Methods

Similar to the SVR method, other conventional fusion methods, such as IHS (Intensity, Hue, Saturation), PCA (Principal Components Analysis) and wavelet fusion, are also operator dependent. Different operators, source data from different areas or data from different times may result in different fusion results.

Moreover, none of them produces good results when used to fuse the multispectral and panchromatic images of "new" satellites such as IKONOS, QuickBird, and Landsat 7. The colour of the fused images is significantly distorted when compared with the original colour of the multispectral images. Such colour distortion has been demonstrated by many image fusion experts, even though manual intervention and colour adjustment were employed. It has been found that the colour distortion varies from scene to scene, and the colour of many pan-sharpened images does not look natural, especially in vegetation areas.

There is, therefore, a need for a new image fusion method that eliminates the need for operator intervention for colour adjustments and, more important, produces fused images of a consistently satisfactory quality.

SUMMARY OF THE INVENTION

Accordingly, the invention relates to a method of fusing a low resolution multispectral image having image bands with a high resolution panchromatic image having one image band, including the steps of selecting image bands from the multispectral image according to the spectral coverage of the panchromatic image, performing a histogram standardization on the selected bands and the panchromatic band, and generating a new synthetic panchromatic image using the selected bands.

In another aspect, the invention relates to a method of fusing a low resolution multispectral image with a high resolution panchromatic image including the steps of selecting from the multispectral image multispectral bands having spectral ranges which overlap the spectral range of the panchromatic image, performing a histogram standardization on the selected multispectral bands and the panchromatic image, determining coefficient values using the selected multispectral bands and the panchromatic image, generating a synthetic panchromatic image using the coefficient values and the selected multispectral bands, and generating one or more fused image bands using the standardized panchromatic image, one or more of the standardized multispectral bands, and the synthetic panchromatic image.

DETAILED DESCRIPTION OF THE PREFERRED EMBODIMENT

Figure 1:
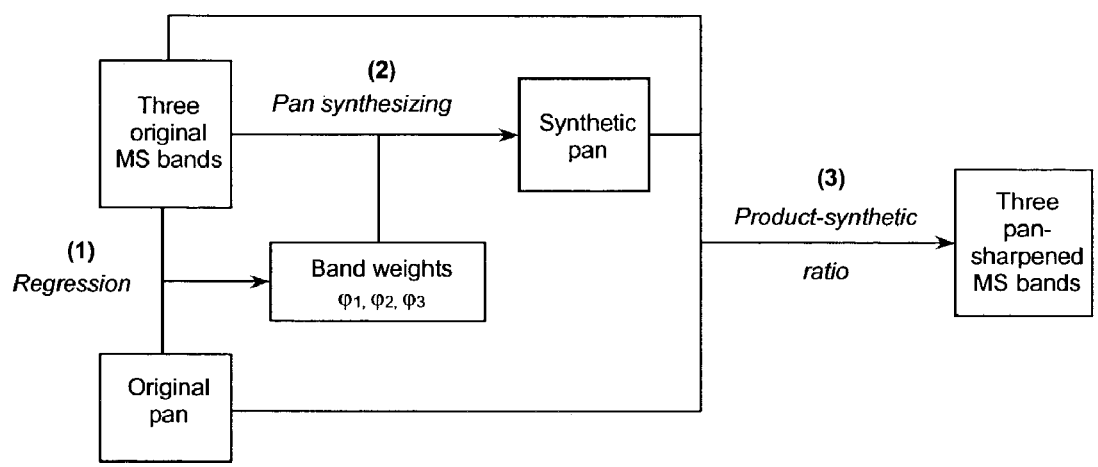
FIG. 1 is a flow chart of the prior art Zhang SVR fusion method.

The major reason for the significant colour distortion in fusion products using imagery from the new satellites is that the spectral ranges of the panchromatic images of the new satellites IKONOS, QuickBird and Landsat 7 vary significantly from those of older satellites such as from SPOT and IRS. The new panchromatic images cover a spectral range from visible to near infrared wavelength, while SPOT and IRS panchromatic images as well as other conventional panchromatic images cover the visible spectral wavelength. This difference makes the existing fusion methods ineffective for successfully fusing the new satellite images because the existing methods are based on conventional panchromatic images.

Table 1 compares the wavelength ranges of various earth observation satellite images. The spectral difference between the panchromatic images of the new satellites (IKONOS, QuickBird and Landsat 7) and the old satellites (launched before 1999, e.g., Landsat 1-5, SPOT and IRS) is shown in the table. The spectral ranges of the panchromatic images of the new satellites extend from visible to near infrared (end up at 0.9 µm), while that of the old satellites locate only in visible range (end up at 0.73 or 0.75 µm).

TABLE 1

Comparison of the wavelength ranges of different Earth Observation satellite sensors:

| | Landsat 4-5 (TM) | | | | | | |
|---|---|---|---|---|---|---|---|
| Band | 1. Blue | 2. Green | 3. Red | 4. Near IR | 5. Mid IR | 7. Mid IR | 6. Thermal |
| Spectral range (µm) | 0.45-0.52 | 0.52-0.60 | 0.63-0.69 | 0.76-0.90 | 1.55-1.75 | 2.08-2.35 | 10.4-12.5 |

TABLE 1-continued

Comparison of the wavelength ranges of different Earth Observation satellite sensors:

| Ground resolution (m) | 30 | 30 | 30 | 30 | 30 | 30 | 120 |
|---|---|---|---|---|---|---|---|

Landsat 7 (ETM+)

| Band | Pan | 1. Blue | 2. Green | 3. Red | 4. Near IR | 5. Mid IR | 7. Mid IR | 6. Thermal |
|---|---|---|---|---|---|---|---|---|
| Spectral range (μm) | 0.52-0.90 | 0.45-0.52 | 0.52-0.60 | 0.63-0.69 | 0.76-0.90 | 1.55-1.75 | 2.08-2.35 | 10.4-12.5 |
| Ground resolution (m) | 15 | 30 | 30 | 30 | 30 | 30 | 30 | 60 |

SPOT 1, 2, 3 (HRV)

| Band | Pan | 1. Green | 2. Red | 3. Near IR |
|---|---|---|---|---|
| Spectral range (μm) | 0.51-0.73 | 0.50-0.59 | 0.61-0.68 | 0.79-0.89 |
| Ground resolution (m) | 10 | 20 | 20 | 20 |

SPOT 5 (HRG)

| Band | Pan | 1. Green | 2. Red | 3. Near IR | 4. Mid IR |
|---|---|---|---|---|---|
| Spectral range (μm) | 0.51-0.73 | 0.50-0.59 | 0.61-0.68 | 0.79-0.89 | 1.58-1.75 |
| Ground resolution (m) | 5 | 10 | 10 | 10 | 10 |

IRS 1C, 1D (PAN, LISS-III)

| Band | Pan | 1. Green | 2. Red | 3. Near IR | 4. Mid IR |
|---|---|---|---|---|---|
| Spectral range (μm) | 0.50-0.75 | 0.52-0.59 | 0.62-0.68 | 0.77-0.86 | 1.55-1.70 |
| Ground resolution (m) | 5.8 | 23 | 23 | 23 | 70 |

IKONOS

| Band | Pan | 1. Blue | 2. Green | 3. Red | 4. Near IR |
|---|---|---|---|---|---|
| Spectral range (μm) | 0.45-0.90 | 0.45-0.52 | 0.52-0.60 | 0.63-0.69 | 0.76-0.90 |
| Ground resolution (m) | 1 | 4 | 4 | 4 | 4 |

QuickBird

| Band | Pan | 1. Blue | 2. Green | 3. Red | 4. Near IR |
|---|---|---|---|---|---|
| Spectral range (μm) | 0.45-0.90 | 0.45-0.52 | 0.52-0.60 | 0.63-0.69 | 0.76-0.90 |
| Ground resolution (m) | 0.61 | 2.44 | 2.44 | 2.44 | 2.44 |

Figure 2:
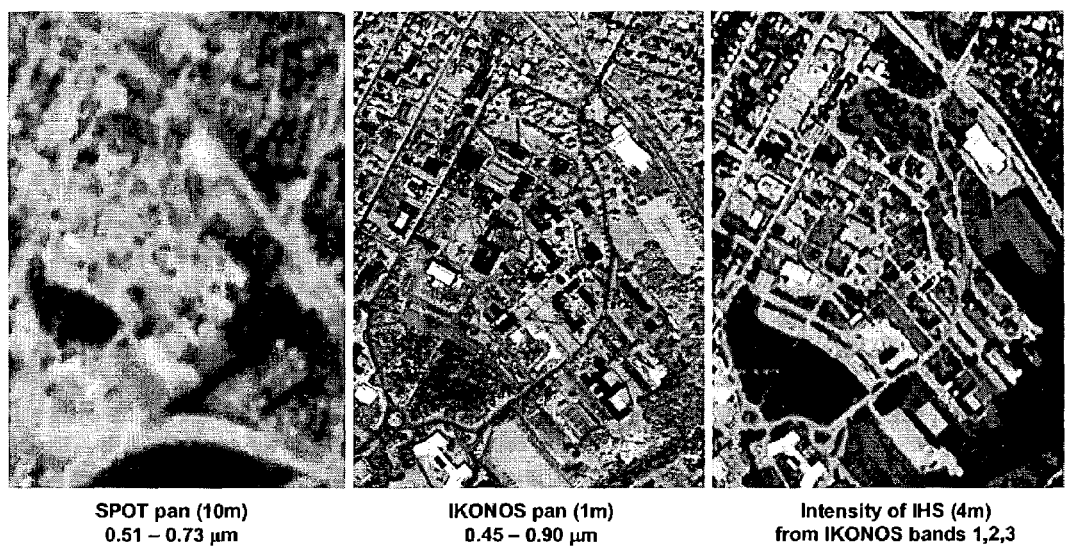
FIG. 2 are digital images showing the grey value difference between IKONOS pan (middle), Intensity image transformed from IKONOS multispectral bands 1, 2, and 3 using IHS technique (right), and grey value of SPOT pan image (left)

Differences in the wavelength range of an image result in different grey value relationships in the image. The influence of the wavelength difference between "old" and "new" panchromatic images on fusion quality can be seen from the grey value difference between the panchromatic images and the intensity image to be replaced (FIG. 2). The left image in FIG. 2 is a SPOT panchromatic image, the image on the right is an intensity image after the IHS transform from IKONOS multispectral bands 1, 2, and 3, and the middle image is an IKONOS panchromatic image.

In the IHS image fusion, the intensity image is replaced by the IKONOS pan first, and then reversely transformed from IHS space to RGB (image) space to produce a pan-sharpened IKONOS image. Because the grey value relationship of the intensity image and that of the IKONOS pan image are significantly different from each other (almost reversed, FIG. 2, right and middle), the replacement of intensity image by the IKONOS pan causes significant colour distortion in the fused image. For example, in the IKONOS pan, the treed areas are brighter than paved and roof areas, while in intensity image treed areas are darker than the paved and roof areas.

The grey value of PC 1 (first principal component) and the grey value of SVR $Pan_{Syn}$ image from IKONOS bands 1, 2, and 3 are similar to that of the intensity image from the same IKONOS bands (FIG. 2, right). They are all significantly different from the IKONOS pan. This significant grey value difference also leads to significant colour distortion in the fused images of the PCA and SVR fusion.

However, the grey value difference between the SPOT pan and the Intensity, PC 1 and $Pan_{Syn}$ images from Landsat TM bands 1, 2, and 3 is not significant, so that the IHS, PCA and SVR techniques can fuse SPOT pan images into Landsat TM or other multispectral images with less colour distortion. The insignificant grey value difference between SPOT pan and the intensity image from Landsat TM bands 1, 2 and 3 can be seen from the difference between the SPOT pan and the IKONOS intensity image in FIG. 2. Since the bands 1, 2, and 3 of Landsat TM and those of IKONOS have the same spectral range, the grey value of the intensity images from both satellites should be similar.

The present invention solves the two major problems of the existing fusion techniques (i) significant colour distortion in fusing the new satellite images, and (ii) the need for operator intervention for reaching a good fusion quality. Using the method of the present invention, the colour distortions of the fused images can be minimized, and the fusion quality can be made operator and data set independent, so that automatic fusion of the multispectral and panchromatic images can be realized.

Figure 3:
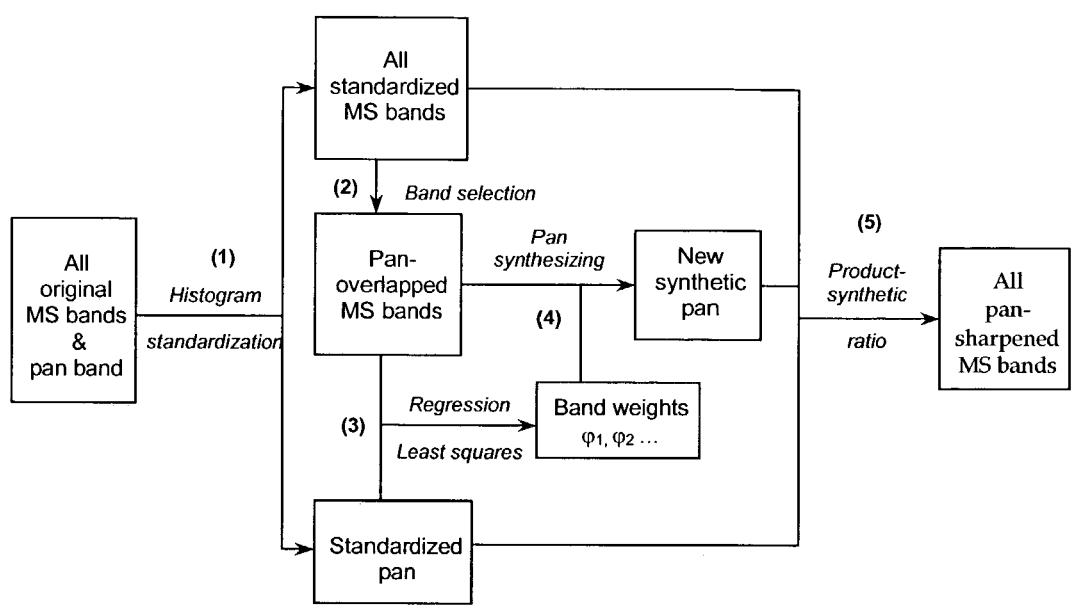
FIG. 3 is a flow chart of a fusion method according to the present invention.

A process flow chart of a fusion method according to the present invention is shown in FIG. 3. This invention is the further development of the Zhang SVR technique. Three major and important developments or improvements have been made to the Zhang SVR technique so that, the colour distortion can be minimized, all the multispectral bands can be fused at one time (it is also possible just to fuse some specified multispectral bands, when needed), and the fusion quality can be made operator and data source independent. The reduction of colour distortion is made possible by including the steps 2, 3 and 4 of FIG. 3 into the process; all the multispectral bands can be fused at one time by generating a common Synthetic Pan for all multispectral bands and modifying the Product-Synthetic Ration equation (step 5); and the operator and data source dependency is eliminated by adding the histogram standardization to all the bands (step 1). Further details of these improvements are described below:

Fusion Algorithm Modification for Minimizing Colour Distortion

One of the major causes of significant colour distortion in the IHS, PCA and SVR fusions is the significant difference between the intensity, PC1 or $Pan_{Syn}$ image and the panchromatic image being fused. If the pixel grey values of the intensity or PC 1 image were very close to those of the panchromatic image, the replacement of the intensity image or the PC1 image by the panchromatic image would not introduce colour distortion into the fusion result. Similarly, for the SVR technique, if the grey values of the $Pan_{Syn}$ image could be made very close to those of the panchromatic image, the ratio of the original panchromatic image to the simulated panchromatic image $Pan_{Syn}$ (see equation 1) would not introduce colour distortion into the SVR fusion result.

Therefore, to solve this colour distortion problem, it is necessary to make the intensity image of the IHS transform, the PC 1 image of the PCA transform or the $Pan_{Syn}$ image of the SVR technique as close to the panchromatic image as possible. A suitable adjustment must be made to conventional fusion algorithms to generate better-fitted intensity, PC1 or $Pan_{Syn}$ images.

In the present invention, a new $Pan_{Syn}$ is produced with very close grey values to those of the original panchromatic images of all kinds of satellites, including Landsat 7, IKONOS and QuickBird. This method is an improvement to equations (2) and (3), of the prior art Zhang SVR technique and uses the following equation for generating a new $Pan_{Syn}$ image:

$$NewPan_{Syn} = \sum \varphi_k Multi_k \quad (4)$$

where $NewPan_{Syn}$ is a new synthetic pan image that has similar grey value relationship to that of the original panchromatic image being fused, $Multi_k$ are those multispectral bands whose spectral ranges are overlapped by the spectral coverage of the panchromatic image (the representative bands), and $\phi_k$ are the coefficients (or weights) for simulating the $NewPan_{Syn}$ image. (Note, the selection of multispectral bands is different from that of the prior art Zhang SVR technique.)

The following equation is applied to calculating the coefficients $\phi_k$:

$$Pan_{Orig} = \sum \varphi_k Multi_k \quad (5)$$

where $Pan_{Orig}$ is the original panchromatic image being fused, and $Multi_k$ are the same multispectral bands as in equation (4). Standard multiple regression and least squares techniques are two appropriate ways to solve the $\phi_k$ from equation (5). Then, the $\phi_k$ are employed in equation (4) for simulating the new synthetic pan image, $NewPan_{Syn}$.

For example, when IKONOS or QuickBird panchromatic images are fused with their multispectral images, $Multi_k$ should be the bands 1, 2, 3, and 4 of IKONOS or QuickBird multispectral data (k equals to 1, 2, 3 and 4); but, when Landsat 7 panchromatic images are fused, $Multi_k$ should be the bands 2, 3 and 4 of the Landsat 7 ETM+ data (k equals to 2, 3 and 4), no matter what combinations of multispectral bands are being fused or which multispectral band is being fused.

The reason for the selection of IKONOS or QuickBird multispectral bands 1, 2, 3, and 4 for the fusion with their panchromatic images is that the bands 1, 2, 3 and 4 together cover the similar or the same spectral range of the panchromatic images (from 0.45 to 0.90 μm). This makes it possible to generate a $NewPan_{Syn}$ which has similar gray relationship to that of the panchromatic image, hence to reduce the colour distortion. The same to Landsat 7 fusion, Landsat 7 panchromatic image covers a spectral range from 0.52 to 0.90 μm which is almost the same range of the total spectral range covered by its multispectral bands 2, 3, and 4. Therefore, using the bands 2, 3, and 4 of Landsat 7 for the NewPan$_{Syn}$ image can ensure the similarity or identity between the NewPan$_{Syn}$ image and the original panchromatic image of Landsat 7.

The same principle applies to the fusion of the panchromatic and multispectral images of other satellites, for example, Landsat TM, SPOT 1-4, IRS, SPOT 5 and the high resolution satellites to be launched. For SPOT 5, since the panchromatic image covers a spectral range of 0.51 to 0.73 μm, the green band and red band (bands 1 and 2) of SPOT 5 are recommended for simulating the NewPan$_{Syn}$ image.

By applying equation (4) and (5), the grey value relationship of the simulated NewPan$_{Syn}$ can be generated very close to that of IKONOS pan, QuickBird pan or Landsat 7 pan images. Consequently, the colour of the fused images can be very close to that of the original multispectral image.

However, in the prior art SVR technique, the same three multispectral bands being fused were used to generate the Pan$_{Syn}$ image. In this way, the grey values of the Pan$_{Syn}$ image can hardly be close to those of the panchromatic image of IKONOS, QuickBird or Landsat 7, except for the fusion of Landsat 7 bands 2, 3, and 4.

Other Methods for Generating the New Pan$_{Syn}$ image

In another embodiment, an alternate method is used to generate the new Pan$_{Syn}$ image. The first three IKONOS multi bands (blue, green, and red) are used to calculate the $\phi_i$ (equation 3) and then generate the Pan$_{Syn}$ using the same three bands (equation 2). The near infrared (NIR) band is then utilised to adjust the grey value of the Pan$_{Syn}$ using arithmetic operations. The goal of this adjustment is to make the Pan$_{Syn}$ have a grey value relationship as close to that of the original pan as possible, resulting in the new Pan$_{Syn}$. A back propagation process can be used to automatically adjust the Pan$_{Syn}$.

The grey values of an intensity image of the IHS transform may be made close to those of the panchromatic image being fused by adjusting the IHS algorithms. The grey values of the PC1 image may also be made closer to those of the panchromatic image by changing parameters of the principal component transform. After an effective adjustment, the colour distortion of the fused results can be reduced. But, these assumptions have not been implemented in this invention.

Generating a Common Synthetic Pan for Fusing All the Multispectral Bands

The selection of representative multispectral bands (covered by the spectral range of the pan image being fused) for generating a new synthetic pan image, as described above, can provide not only the possibility to reduce the colour distortion. It can also generate a common synthetic pan image for the fusion of all other multispectral bands or just some individual bands. The equation for fusing (pan-sharpening) all or individual multispectral bands can be written as:

$$\text{Fused Band}_i = \text{Multi}_i \times \frac{\text{Pan}_{Orig}}{\text{NewPan}_{Syn}} \quad (6)$$

where Fused Band$_i$ are the fused image bands, Multi$_i$ are original multispectral bands being fused, i is band number which can be all or just some individual multispectral bands, and Pan$_{Orig}$ is the original panchromatic image.

Different from the prior art Zhang SVR fusion, the i in equation (6) does not equal to the k in equations (4) and (5). However, in the Zhang SVR, i is equivalent to k (equations (1), (2) and (3)). For example, in the present invention i can be 1, 2, 3 and 4 or any other multispectral bands when IKONOS or QuickBird images are fused, while k equals to 1, 2, 3 and 4. When Landsat 7 images are fused, i can be 1, 2, 3, 4, 5 and 7 or any bands combination from the multispectral bands, while k should be bands 2, 3, and 4. In the Zhang SRV technique, however, only three multispectral bands could be fused at one time and the Pan$_{Syn}$ image was simulated with these same three multispectral bands (i=k).

After the NewPan$_{Syn}$ is simulated, all the four IKONOS or QuickBird multispectral bands, or all the six Landsat 7 bands can be pan-sharpened at one time.

Histogram Standardization for Eliminating the Influence of Operator and Data Set Difference Once the NewPan$_{Syn}$ is simulated, it is possible to produce well-fused satellite images, including IKONOS, QuickBird and Landsat 7. However, manual intervention is still required during the fusion process to reach an optimal fusion result, because the variation of the grey value distributions (histograms) of individual bands can also cause colour distortion in the fused images. Usually, different image bands have different grey value distributions (means and standard deviations—see FIG. 4, left). This difference makes the individual bands unequally contribute to the fusion result that, consequentially, lead to colour distortions. Therefore, the fusion quality is often still operator and data set dependent after producing the NewPan$_{Syn}$.

To solve this problem, it is necessary to adjust the grey value distributions (histograms) of individual bands, including all multispectral and panchromatic bands being fused, before the fusion process. The goal of this adjustment (also called histogram standardization) is to make all the bands have the same or similar ranges of grey value distribution (deviation), and same or similar means (FIG. 4, right), so that all the bands being fused can equally contribute to the fusion result. This equal contribution from all the bands ensures a balanced colour influence from each multispectral band and a balanced influence from the panchromatic image. Consequently, the similarity of the colours between the original multispectral image and the fused image can be further ensured, no matter what grey value distributions the original bands have. This histogram standardization can eliminate the operator and data set dependency of the fusion process, so that the requirement for manual interaction and colour adjustment becomes superfluous.

Figure 4:
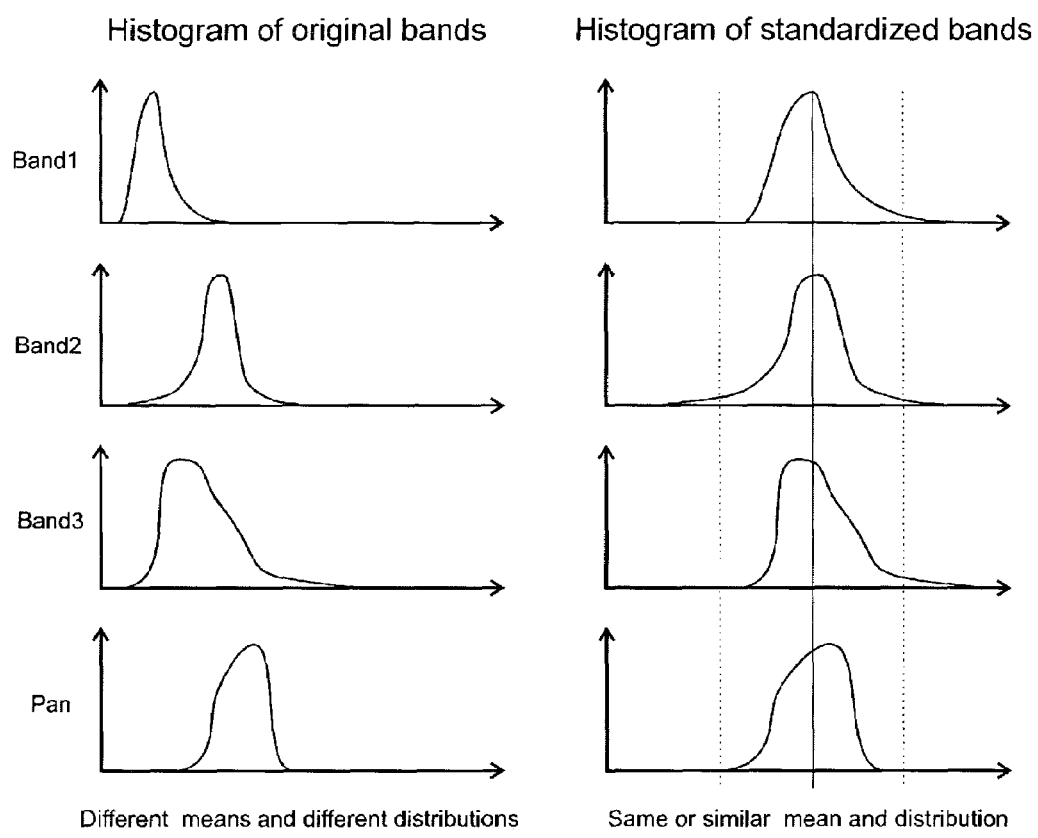
FIG. 4 illustrates individual histograms before and after the histogram standardization according to the present invention.

This histogram standardization process is based on the statistical analysis and adjustment of the standard deviations and means of the grey values in all the image bands. The steps of this standardization are:

1. calculate the means and standard deviations of all the bands; and
2. stretch the histograms of all the image bands to a common full grey value range with a common mean according to their individual means and standard deviations. The approaches can be for example:
   (a) Determine the full grey value range and the common mean:
   The full grey value range can be defined as equal to the maximum grey value range of all the original image bands used in the fusion, or defined as equal to the average grey value range of the bands (FIG. 4). The location of this full grey value range should be located at the average location of the original grey values of all the bands. The common mean is located at the centre of the full grey value range (FIG. 4, right).
   (b) Stretch all bands to the common full range:
   Stretch the original grey values of each band that lie within a certain standard deviations (e.g. between ±3σ and ±7σ, recommended ±4σ, ±5σ or ±6σ) to the full grey value range (FIG. 4).

Other alternatives may also be applied to standardize the grey value distributions of all the bands. For example, for 8-bits bands, the common mean can be located at the centre (128) of the full grey value range (0-255), and the grey values within a certain standard deviation are stretched to the full range (0-255). The most important thing in the standardization is to have a common mean and common distribution for all bands. The recommended approaches in (a) and (b) above can maintain the histograms of the fused image bands having similar histogram distributions to those of the original ones. This is preferred by many applications, especially for image classifications. The means and deviations of the fused image bands can also be converted back to the original means and deviations of individual bands to keep better similarity between the histograms before and after the fusion.

This histogram standardization can also be applied to conventional fusion techniques, such as IHS, PCI, SVR and Wavelet, for fusing conventional images, such as Landsat TM, SPOT, IRS and other images with panchromatic images in visible range, to reduce colour distortion and operator and dataset dependency.

After generating the $NewPan_{Syn}$ image (or an new intensity or PC1 image) with very close grey values to those of the original panchromatic image being fused, it is possible to generate a well-fused multispectral image; however, colour distortion may still remain in the fused image due to the unequal contributions from different multispectral bands and the panchromatic band. Therefore, the histogram standardization of all the bands should be integrated with the generation of the $NewPan_{Syn}$ for an optimal fusion result.

FIG. 3 shows a method of integrating the histogram standardization and the generation of the $NewPan_{Syn}$ into the fusion process.

Other methods for integrating the standardization and the $NewPan_{Syn}$ generation also exist. For example, the method set out below also works well:

(1) Calculate means, deviations, and covariance matrix from all the original bands, (2) Calculate the band weights from the covariance matrix (because the means and deviations of individual bands have been considered in the covariance calculation, the band weights calculated from the original bands or the standardized bands are the same, so that the band weights can also be calculated before the standardization), for IKONOS and QuickBird, use all the elements from the covariance matrix;

for Landsat 7 or other satellites, select the correct elements from the covariance matrix for calculating the band weights;

(3) Standardize all the bands using the means and deviations, (4) Generate the NewPanSyn using the band weights and the selected standardized bands, (5) Perform the Product-Synthetic Ratio using the standardized bands and the NewPanSyn.

After the integration, an automatic process for fusing IKONOS, QuickBird, or Landsat 7 images (and the alike) can be realized resulting in fused images—with an optimal spectral effect (minimized colour distortion), an optimal spatial effect (maximized spatial detail), and an optimal (or natural) effect of colour and spatial detail integration.

It will be understood that the fusion methods of the present invention are not limited to fusing images from IKONOS, QuickBird and Landsat 7, but can also be used to fuse any panchromatic images which cover a spectral range from visible to near infrared wavelength. Further, using the same concept described in equations (4), (5) and (6) by selecting representative multispectral bands for generating a $NewPan_{Syn}$ and integrating the histogram adjustment into the fusion process, other images, no matter what the wavelength range of the high resolution panchromatic images, can also be fused resulting in optimal results.

Different IKONOS, Landsat 7 and QuickBird images covering different areas, taken at different times, and containing different image sizes have been fused using the new fusion technique of the present invention. All the fused images have shown an optimal effect for all the multispectral bands (e.g., bands 1, 2, 3 and 4 for IKONOS and QuickBird, and bands 1, 2, 3, 4, 5 and 7 for Landsat 7). No manual intervention was required for adjusting any image band before, during or after the fusion process. The fusion quality has been excellent for all the results with:

minimized colour distortion (almost identical to the colour of the original multispectral image), maximized spatial detail (containing all the spatial detail of the panchromatic image), and naturally (smoothly) integrated colour and spatial detail (the colour and special detail of individual fused pixels appear almost identical to those of original multispectral images with a high-resolution equal to the panchromatic image).

The fusion with Landsat TM multispectral bands and SPOT HRV panchromatic has also resulted in same fusion results.

System Requirement for Running the Fusion Based on the Present Invention

The calculations for the histogram standardization, the weights $\phi_k$, the $NewPan_{Syn}$, and the fusion of all the bands (Product-Synthetic Ratio) are not computation intensive. The fusion process does not require a larger memory and higher process speed than other ordinary image processing tools or software. For example, systems which can run the popular IHS fusion or PCA fusion should be enough for running the fusion of this invention. The processing speed is similar to or faster than that of the IHS or PCA fusion.

In the testing of this new fusion technique, most images fused were around 10,000 by 10,000 pixels in size. The fusion processes were mostly done with 16 bits image depth to preserve the detailed spectral information. All the multispectral bands were fused at one time. Each band takes roughly 200 MB of space. The data size of all the bands together is larger than 1 GB. However, all the fusions were finished smoothly by using a desktop PC with a Pentium 4 processor and a 1 GB RAM.

In a preferred embodiment of the invention, the methods of the present invention are implemented by a programmed computer and the method is used and can be sold as a computer program product comprising a computer program or software tool stored on a machine-readable medium such as a CD Rom or floppy disc.

I claim:

1. A method of fusing a low resolution multispectral image having image bands with a high resolution panchromatic image having one image band, comprising the steps of:

selecting image bands from the multispectral image according to the spectral coverage of the panchromatic image;

determining the full grey value range and the common mean wherein the full grey value range is equal to the maximum grey value range of all the original image bands used in the fusion and the common mean is located at the centre of the full grey value range;

performing a histogram standardization on the selected multispectral bands and the panchromatic band; and generating a new synthetic panchromatic image using the selected multispectral bands.

2. A method according to claim 1 wherein the new synthetic panchromatic image is generated using the equation:

$$NewPan_{Syn} = \sum \varphi_k Multi_k$$

where $NewPan_{syn}$ is the new synthetic panchromatic image, $Multi_k$ are the selected multispectral bands whose spectral ranges are overlapped by that of the panchromatic image and $\phi_k$ are coefficients for simulating the $NewPan_{syn}$ image.

3. A method according to claim 2 wherein the coefficients $\phi_k$ are calculated using the equation:

$$Pan_{Orig} = \sum \varphi_k Multi_k$$

where $Pan_{Orig}$ is the original panchromatic image being fused.

4. A method according to claim 1 wherein the step of performing a histogram standardization on the selected image bands comprises the steps of:
 (a) calculating the means and standard deviations of the selected bands; and
 (b) stretching the histograms of the selected image bands to a common full grey value range with a common mean according to their individual means and standard deviations.

5. A method according to claim 4, wherein the image bands in the stretching step lie within a standard deviation of ±2σ or greater.

6. A method according to claim 1, wherein the spectral range of the bands selected from the multispectral image overlaps the spectral range of the panchromatic image.

7. A method according to claim 6, wherein at least one of the bands selected from the multispectral image is different.

8. A method according to claim 6, wherein the images being fused are optical images selected from the group consisting of images from a satellite sensor, an airborne sensor and a digital camera.

9. A method of fusing a low resolution multispectral image with a high resolution panchromatic image comprising the steps of:
 (a) selecting from the multispectral image, multispectral bands having spectral ranges which overlap the spectral range of panchromatic image;
 (b) calculating means, deviations, and a covariance matrix from all the image bands;
 (c) performing a histogram standardization on the selected multispectral bands and the panchromatic image;
 (d) standardizing all the bands in the multispectral image and the panchromatic image using the means and deviations;
 (e) determining coefficient values using the selected multispectral bands and the panchromatic image;
 (f) calculating band weights for simulating a synthetic panchromatic image from the covariance matrix;
 (g) generating a synthetic panchromatic image using the coefficient values and the selected multispectral bands;
 (h) generating a synthetic panchromatic image using the band weights and the selected standardized bands; and
 (i) performing a Product-Synthetic Ratio using the standardized panchromatic band, the standardized multispectral bands and the synthetic panchromatic image;
 (j) generating one or more fused image bands using the standardized panchromatic image, one or more of the standardized multispectral bands, and the synthetic panchromatic image.

10. A method according to claim 9 wherein the synthetic panchromatic image has a grey value variation similar to that of the panchromatic image.

11. A method according to claim 9, wherein the selected multispectral bands together cover a spectral range close or equal to that of the panchromatic image within the range from visible to infrared.

12. A method according to claim 9, wherein the images being fused are optical images selected from the group consisting of images from a satellite sensor, an airborne sensor and a digital camera.

13. A method according to claim 12, wherein for IKONOS and QuickBird images, the selected multispectral bands are bands 1, 2, 3 and 4.

14. A method according to claim 12, wherein for Landsat 7 images, the selected multispectral bands are bands 2, 3 and 4.

15. A method according to claim 13, wherein the fused image bands are any three multispectral bands.

16. A method according to claim 13, wherein the fused image bands are one or more bands selected from the group comprising bands 1, 2, 3 and 4.

17. A method according to claim 16, including the step of fusing bands 1, 2, 3 and 4 at the same time.

18. A method according to claim 14, wherein the fused image bands are one or more bands selected from the group comprising bands 1, 2, 3, 4, 5 and 7.

19. A method according to claim 18, including the step of fusing bands 1, 2, 3, 4, 5 and 7 at the same time.

20. A method according to claim 9, wherein the coefficient values are generated using a computational method selected from the group comprising regression and least squares.

* * * * *

UNITED STATES PATENT AND TRADEMARK OFFICE
CERTIFICATE OF CORRECTION

PATENT NO. : 7,340,099 B2
APPLICATION NO. : 10/345932
DATED : March 4, 2008
INVENTOR(S) : Yun Zhang It is certified that error appears in the above-identified patent and that said Letters Patent is hereby corrected as shown below:

Title Page, Item (56) References Cited
Other Publications

1) Reference [1]: Cornet et al., RS Data Fusion by Local Mean and Variance Matching Algorithms: their Respective Efficiency in a Complex Urban Content, Nov. 8-9, 2001, IEEE/ISP 2001 Remote Sensing and Data Fusion over Urban Areas, pp. 105-109.*

Should read:

Cornet et al., RS Data Fusion by Local Mean and Variance Matching Algorithms: Their Respective Efficiency in a Complex Urban Context, Nov. 8-9, 2001, IEEE/ISP 2001 Remote Sensing and Data Fusion over Urban Areas, pp. 105-109.*

2) Reference [2]: Zito-Jiao et al., Classification-Based Fusion of IKONOS 1-m High-Resolution Panchromatic Image and 4-m Multi-Spectral Images, Jul. 9-13, 2001, IGARRS '01, vol. 2, pp. 703-705*

Should read:

Ziti-Jiao et al., Classification-Based Fusion of IKONOS 1-m High-Resolution Panchromatic Image and 4-m Multi-Spectral Images, Jul. 9-13, 2001, IGARSS '01, vol. 2, pp. 703-705.*

3) Reference [4]: Zhang, Y et al., Photogrammetrie Engineering & Remote Sensing, vol. 59, No. 1, Jan. 1, 1993, pp. 67-72.

Should be removed, as it is not an actual reference.

Signed and Sealed this

Third Day of August, 2010

David J. Kappos
*Director of the United States Patent and Trademark Office*

CERTIFICATE OF CORRECTION (continued)
U.S. Pat. No. 7,340,099 B2

4) Reference [5]: Zhang, Y et al., Vergleich verschiedener Verfahren zur Kombination multispectraler Satelliten-Bilddaten, Photogrammetrie-Fernerkundung-Geoinformation, May 1998, pp. 261-274.

Should read:

Zhang, Y. et al., Vergleich Verschiedener Verfahren zur Kombination Multisensoraler Satelliten-Bilddaten, Photogrammetrie-Fernerkundung-Geoinformation, May 1998, pp. 261-274.

5) Reference [6]: Zhang, Y., A New Merging Method ...

Should be removed.

6) Reference [7]: Munechika et al., Resolution Enhancement Multispectral Image Data to Improve Classification Accuracy, Photogrammetric Engineering & Remote Sensing, vol. 59, No. 1, 1993.

Should read:

Munechika et al., Resolution Enhancement of Multispectral Image Data to Improve Classification Accuracy, Photogrammetric Engineering & Remote Sensing, vol. 59, No. 1, January 1993, pp. 67-72.

7) Reference [8]: Zhang, Y. et al., Vergleich ...

Should be removed.